(12) United States Patent
Beier (10) Patent No.: US 6,905,724 B1
(45) Date of Patent: Jun. 14, 2005

(54) DERIVATIZATION OF SUPPORT SURFACES

(75) Inventor: Markus Beier, Heidelberg (DE)

(73) Assignee: Deutsches Krebsforschungszentrum Stiftung des Offentlichen Rechts, Heidelberg (DE)

( * ) Notice: Subject to any disclaimer, the term of this patent is extended or adjusted under 35 U.S.C. 154(b) by 0 days.

(21) Appl. No.: 09/856,341

(22) PCT Filed: Nov. 17, 1999

(86) PCT No.: PCT/DE99/03692

§ 371 (c)(1),
(2), (4) Date: Aug. 27, 2001

(87) PCT Pub. No.: WO00/29373

PCT Pub. Date: May 25, 2000

(30) Foreign Application Priority Data

Nov. 18, 1998 (DE) .......................................... 198 53 242

(51) Int. Cl.[7] .................................................. B05D 3/00
(52) U.S. Cl. ...................... 427/2.31; 427/2.13; 427/301; 427/407.1; 427/407.2; 427/412.2; 427/412.5
(58) Field of Search ................................. 427/2.1, 2.11, 427/2.13, 2.24, 2.25, 2.3, 2.31, 301, 322, 407.1, 407.2, 412.2, 412.5

(56) References Cited

U.S. PATENT DOCUMENTS

| | | | | |
|---|---|---|---|---|
| 4,837,348 A | | 6/1989 | Stolowitz et al. | ............... 556/9 |
| 5,607,475 A | * | 3/1997 | Cahalan et al. | ............. 424/423 |
| 5,624,711 A | | 4/1997 | Sundberg et al. | ........... 427/261 |
| 5,672,638 A | * | 9/1997 | Verhoeven et al. | ......... 523/112 |
| 6,509,059 B2 | * | 1/2003 | Yang et al. | .................. 427/230 |

FOREIGN PATENT DOCUMENTS

WO  WO 00/02656  1/2000

OTHER PUBLICATIONS

Beier, Markus, et al.; *Versatile Derivatisation of Solid Support Media for Covalent Bonding on DNA–Microchips*; Nucleic Acids Research, Oxford Unviersity Press; vol. 27, No. 9, pp. 1970–1977; (May 1, 1999).

Burgess, Kevin et al.; *Solid Phase Syntheses of Oligoureas*; Journal of the American Chemical Society; vol. 119, No. 7; pp. 1556–1564; (Feb. 19, 1997).

Swali, Vinay, et al.; *Solid–Phase Dendrimer Synthesis and the Generation of Super–High–Loading Resin Beads for Combinatorial Chemistry*; The Journal of Organic Chemistry; vol. 62, No. 15; pp. 4902–4903; (Jul. 25, 1997).

Tam, James P.; *Synthetic Peptide Vaccine Design: Synthesis and Properties of a High–Density Multiple Antigenic Peptide System*; Proceedings of the National Academy of Sciences of the United States of America; vol. 85, No. 15; pp. 5345–5758; (Aug., 1988).

Terrett, Nicholas K., et al; *Combinatorial Synthesis—The Design of Compound Libraries and Their Application to Drug Discovery*; Tetrahedron Report No. 377; vol. 51, No. 30; pp. 8135–8173; (Jul. 24, 1995).

Tsubokawa, Norio, et al.; *Surface Grafting Onto Aramid Powder: Reaction of Acyl Chloride Groups on the Surface with Functional Polymers Having Terminal Hydroxyl or Amino Groups*; Polymers for Advanced Technologies; vol. 5, No. 12; pp. 824–828; (Dec. 1994).

Tsubokawa, Norio et al.; *Grafting of 'Dendrimer–Like' Highly Branched Polymer Onto Ultrafine Silica Surface*; Reactive & Functional Polymers; vol. 37; pp. 75–82; (1998).

\* cited by examiner

*Primary Examiner*—Fred J. Parker
*Assistant Examiner*—William Phillip Fletcher, III
(74) *Attorney, Agent, or Firm*—Howrey Simon Arnold & White, LLP; Viola T. Kung (57) ABSTRACT

The present invention relates to a process for derivatizing supports on a carriers, wherein a functional group is activated on a support surface by reaction with an activating reagent and then reacted with an amine component. The invention also relates to a support with a dendrimer structure on its surface and to the use of a support that has been produced according to the invention for binding biopolymers.

9 Claims, 2 Drawing Sheets

Generation of dendrimer structures with activation bvy 4-nitrophenyl chloroformate

DERIVATIZATION OF SUPPORT SURFACES

This application is a National Stage of International Application PCT/DE99/03692, filed Nov. 17, 1999; which claims the priority of DE 198 53 242.3 filed Nov. 18, 1998.

TECHNICAL FIELD

The present invention relates to a method of derivatizing support or carrier surfaces and to support or carrier surfaces derivatized thereby.

BACKGROUND OF THE INVENTION

The binding of biopolymers, in particular nucleic acids, to solid support or carrier surfaces is generally obtained to date by the following alternatives:
1) Applying biopolymers (e.g. nucleic acids) to surfaces: Here above all poly-L-lysine coated glass supports and nylon membranes are used. In this case, the biopolymers are bound to the support by means of charging. When poly-L-lysine coated glass supports are used, it is disadvantageous that no covalent linkage takes place between the coated surface and the biopolymer. The support can only be used once. Furthermore, there are virtually no possibilities of optimizing the distance between biopolymer and support. When nylon membranes are used, it is disadvantageous for the biopolymers to be also largely bound only by means of charging. Although the support may be used several times, it is not possible to optimize the distance between biopolymer and support.
2) In situ structure of biopolymers (e.g. nucleic acids) on surfaces: Here common linker systems are used which originate from the biopolymer synthesis on porous CPG materials. The linker molecules used are usually polyethylene glycol, in particular tetra- or hexaethylene glycol. The linker molecules are usually applied by cost-intensive reagents in analogy to the phosphoramidite chemistry. Mass production and the application of charges are unfortunately not possible.

All of these methods also have the drawback of lacking flexibility, and the biopolymers can only be applied on the surface in very limited numbers.

SUMMARY OF THE INVENTION

The object of the present invention now consists in providing a method permitting optimum binding of a large number of biopolymers to support surfaces. The object also consists in providing a support surface whose binding capacity has been increased many times by carrying out a surface modification:

These objects are achieved by the subject matters defined in the claims.

DETAILED DESCRIPTION OF THE INVENTION

In particular, this object is achieved by a method with which a functional group is activated on a support surface by an activating reagent and is subsequently reacted with an amine component.

The method according to the invention is preferably based on the following synthesis principles:

wherein $R_1$ and $R_2$ may be equal or different. The meanings of $R_1$ and $R_2$ are not subject to limitation and may be H or any organic residue (e.g. a straight-chain or branched alkyl residue having 1 to 30 carbon atoms, a straight-chain or branched alkenyl residue having 2 to 30 carbon atoms, a monocyclic or polycyclic alkyl residue having 3 to 30 carbon atoms or a monocyclic or polycyclic alkenyl residue having 4 to 30 carbon atoms or a monocyclic or polycyclic residue having 6 to 30 carbon atoms, wherein the residues may optionally be substituted by one or more substituents (e.g. OH, carboxyl, carbonyl, phosphate). The base may be any basic compound, e.g. diisopropylethylamine.

Any straight-chain or branched $C_{1-30}$ alkyl residue may be used. Examples thereof are methyl, ethyl, propyl, isopropyl, butyl, isobutyl, tert.-butyl, n-butyl, n-hexyl, 2-methylpentyl, 2,3-dimethylbutyl, n-heptyl, 2-methylhexyl, 2,3-dimethylpentyl, 3,3-dimethylpentyl, 3-ethylpentyl, n-octyl, 2,2-dimethylhexyl, 3,3-dimethylhexyl, 3-methyl-3ethylpentyl groups. Short alkyl chains, such as methyl, ethyl, propyl and isopropyl groups, are preferred.

Any straight-chain or branched $C_{2-30}$ alkenyl residue may be used. Examples thereof are vinyl, propenyl, isopropenyl, allyl, 2-methylallyl, butenyl or isobutenyl, hexenyl or isohexenyl, heptenyl or isoheptenyl, octenyl or isooctenyl groups. Vinyl, propenyl and isopropenyl groups are preferred.

The cycloalkyl residue having 3 to 30 carbon atoms may be any cycloalkyl residue. Examples thereof are cyclopropyl, cyclobutyl, cyclopentyl or cyclohexyl, cycloheptyl, cyclooctyl, cyclononyl or cyclodecyl group. Cyclopropyl, cyclobutyl, cyclopentyl and cyclohexyl groups are preferred.

The cycloalkenyl residue having 4 to 30 carbon atoms may be any cycloalkenyl residue. Examples thereof are cyclobutenyl, cyclopentenyl or cyclohexenyl, cycloheptenyl, cyclooctenyl, cyclononenyl or cyclodecencyl groups. Cyclobutenyl, cyclopentenyl, or cyclohexenyl groups are preferred. Examples of polycyclic alkyl or alkenyl residues comprise norbornane, adamantane or benzvalene.

$R_1$ and $R_2$ may also be any monocyclic or polycyclic C6–30 aryl residues. Examples thereof are a carbocyclic, monocyclic residue, e.g. the phenyl group, a heterocyclic, monocyclic residue, e.g. the groups thienyl, furyl, pyranyl, pyrrolyl, imidazolyl, pyrazolyl, pyridyl, pyrazinyl, pyrimidinyl, pyrazinyl, thiazolyl, oxazolyl, furazannyl, pyrrolinyl, imidazolinyl, pyrazolinyl, thiazolinyl, triazolyl, tetrazolyl, and the positional isomers of the hetero atom or atoms which may comprise these groups. By the method according to the invention more or less cross-linked linker systems form on the support surface, which permit binding of an optionally large number of biopolymers on the support surface. Preferred biopolymers are DNA, RNA, nucleic acid analogs, peptides, proteins, antibodies, etc. According to the invention a functional group is understood to mean a chemical grouping located on a support surface, such as an amino group, hydroxyl group, carboxyl group, carbonyl group, thiol, amide or phosphate group.

According to the invention any support or matrix common in this field can be used. They comprise in particular glass, sheets or films or membranes made of polypropylene, nylon, cellulose, cellulose derivatives (e.g. cellulose acetate, cellulose mixed ester), polyethersulfones, polyamides, polyvinyl chloride, polyvinylidene fluoride, polyester, TEFLON® (synthetic resinous flouorine-containing polymers) or polyethylene.

According to the invention an activating reagent is understood to mean a reagent which places functional groups located on the support surface in a condition ready for linkage. Preferred activating reagents are 4-nitrophenyl chloroformate (=chloroformic acid-4-nitrophenylester), carbonyl diimidazole, acryloylchloride (acrylic acid chloride), phenylchloroformate, phosgene, diphosgene, triphosgene, EDC (N-(3-dimethylaminopropyl)-N'-ethylcarbodiimide hydrochloride), N,N'-diisopropyl carbodiimide, dicyclohexyl carbodiimide, dissucinimidyl carbonate, disuccinimidyl oxalate, dimethylsuberimidate dihydrochloride or phenylene diisothiocyanate, the three former ones being most preferred.

Figure 1:
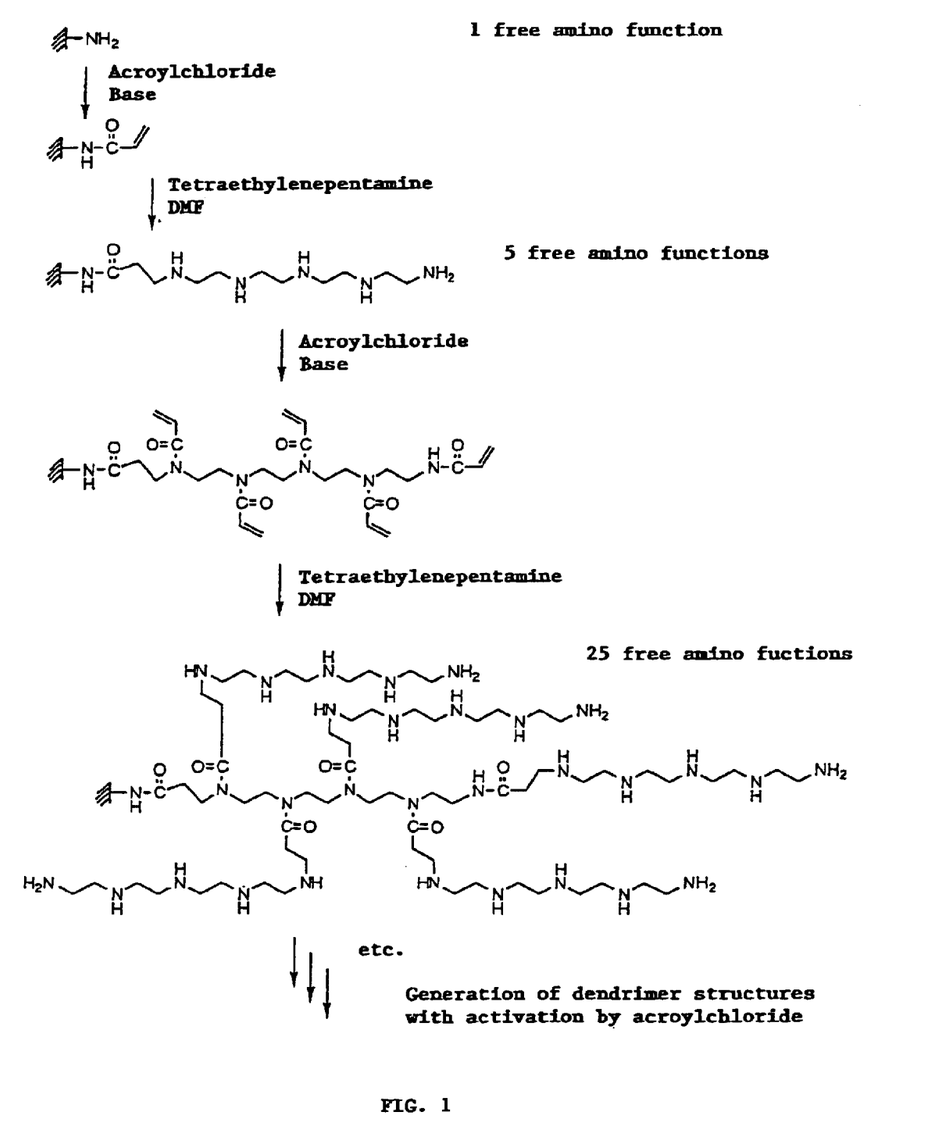
FIG. 1: generation of dendrimer structures after activation with acryloylchloride
Figure 2:
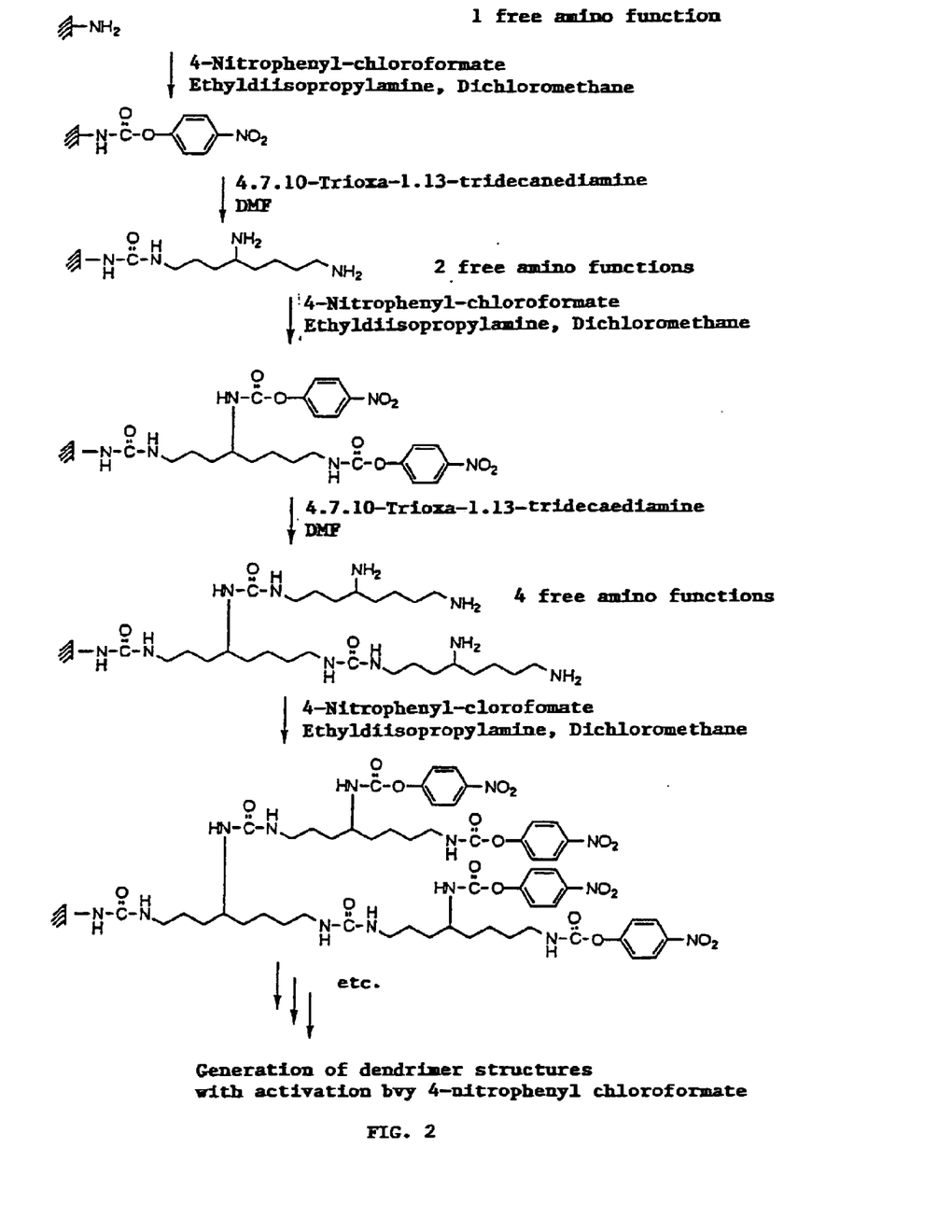
FIG. 2: generation of dendrimer structures after activation with 4-nitrophenylchloroformate The invention is described in more detail by means of the examples.

According to the invention an amine component is understood to mean monoamines, bis-amines or polyamines. Preferred monoamines are 2-aminoethanol, 6-amino-1-hexanol, 2-(4-aminophenyl)ethanol, 5-amino-n-valeric acid, 2-(2-aminoethyoxy)ethanol, 3-amino-1,2-propanediol; preferred bis-amines are 1,4-bis(3-aminopropoxy)butane, O,O'-bis(2-aminopropyl)polyethylene glycol 500 (=JEFFAMINE® 500), O,O'-bis(2-aminopropyl) polyethylene glycol 130 (=Jeffamine 130), 4,7,10-trioxa-1,13-triadecaneamine, ethylene diamine, N-methylimidazole, diisopropylethylamine; and preferred polyamine are tetraethylene pentamine, spermine, spermidine, 4,7,10-trioxa-1,13-tridecane diamine, 4-aminomethyl-1,8-octane diamine. By incorporating amines preferably positive charges can be implemented into the linker system, since they are present in protonated condition within the physiological region. The degree of the surface charge can be controlled by selecting the corresponding amine. Positive charges effect an easier approach of negatively charged biopolymers (e.g. nucleic acids) and thus facilitate hybridizations on the support surfaces treated according to the invention. The use of bis-amines or polyamines serves for controlling the chain length, i.e. the length of the linker system, by the length of the amine and the number of repeated passing through the below synthesis principles. By selecting the amine it is possible to control the individual character of the linker system, i.e. whether it is rather hydrophobic or hydrophilic. By selecting the amine, other functional groups (e.g. hydroxyl, phosphate, carboxyl, carbonyl groups) may, of course, also be presented on the surface in addition to amine groupings. For example, it is advantageous for introducing a linker carrying OH groups to carry out the reaction with an amine alcohol. When a bifunctional amine is used, the chain is extended linearly. Branchings are incorporated into the linker system by polyfunctional amine reagents. As a result, what is called dendrimer structures are built up (see FIGS. 1 and 2). According to the invention a dendrimer structure means that structures result which start from a defined starting point and have more than one branches. The advantage of this is above all that in the case of support materials with otherwise low charging capacity (e.g. glass) the charging can be increased in well-calculated manner and thus greater amounts of biopolymers can be applied. When polyfunctional amines (m=number of the amino functions) are used, x positions (functions) may be utilized for a binding of biopolymers after n rounds (1 round=cycle from activation and reaction with amine):

$x=(m-1)^n$ (in the case of activation with 4-nitrophenyl chloroformate or carbonyl diimidazole)

$x=m^n$ (in the case of activation with acryloylchloride)

Arithmetical example: tetraethylene pentamine (m=5), 3 rounds (n=3), acryloylchloride as activating agent---->$5^3$= 125, i.e. 125 times the charging capacity of the support.

In order to obtain a more or less cross-linked linker system on the support surface, the above reactions are repeated in well-calculated fashion. By this, the distance between support material and the biopolymer to be bound is controlled and also the physical properties of the linker are defined. By the method according to the invention a flexible linker system is created. It is flexible in so far as for any use (e.g. binding of DNA, RNA, proteins, antibodies) perfectly prepared support surfaces are provided. In particlar, the method according to the invention is adapted to provide surfaces (supports) suitable for the DNA/biochip technology. The degree of positive charge on the surface can be controlled by a number of protonatable amine functions, above all by the incorporation of polyamines. For example, the objective of increasing the charging density is preferably realized by incorporating branching sites (e.g. polyamines); the increase in the positive surface charge may be effected by the incorporation of protonatable amino functions, for example; variation of the distance between biomolecule and surface can be controlled by using amines having different chain lengths.

The method according to the invention for modifying the surface is characterized by the following steps. The support materials to be derivatized are admixed in a reaction vessel with 5–100 ml (depending on the size), preferably 10–30 ml, most preferably 20 ml, anhydrous solvent (e.g. dichloroethane, tetrachlorocarbon, THF, DMF, DMSO, HMPT (=HMPA), dichloroethane, acetonitrile) with about 0.5 to 5 mmol, preferably 1–3 mmol, most preferably 1 mmol, activating reagent (e.g. acryloylchloride, 4-nitrophenylchloroformate, carbonyldiimidazole). The reaction is started in the case of acryloylchloride and 4-nitrophenyl chloroformate by adding about 0.5 to 5 mmol, preferably 1–3 mmol, most preferably 1 mmol, diisopropylethylamine (or another non-nucleophilic base, such as triethylamine, pyridine, collidine, lutidine or triisoproylamine). After 1 to 4 hours, preferably 2 hours, of swirling on a shaker, the supports are throughougly washed with an anhydrous solvent (e.g. dichloroethane, tetrachlorocarbon, etc.) and allowed to dry, preferably air-blown using nitrogen. In order to check the reaction, a quality control is carried out. For example, the above-mentioned aminated PP control piece is subjected to the below described bromophenol blue test. If as compared to a non-reacted sample no blue staining can be detected, the activation was successful. If blue staining occurs, the reaction is repeated. The then activated support materials are admixed in about 5–100 ml (depending on the size), preferably 10–50 ml, most preferably 20 ml, of an amine-free and anhydrous solvent (e.g. DMF, acetonitrile, THF, DMSO, HMPT (HMPA) or dichloromethane) with about 0.5–5 mmol, preferably 1–3 mmol, preferably 1 mmol, amine component and swirled for about 5–20 hours, preferably overnight. Washing is carried ot thoroughly, e.g. in succession with DMF, methanol and dichloroethane, and the then derivatized supports are allowed to dry or are air-blown using nitrogen. In the case of supports activated using acryloylchloride, a reaction time extended to 1.5 to 2.5 days, preferably 2 days, is preferred. For checking the reaction, a quality control is carried out, e.g. the above-mentioned PP control piece is subjected to the below described bromophenol blue test. If as compared to an activated sample of the last step blue staining can be detected, the reaction was successful. If no or only very weak blue staining occurs, the reaction is repeated. The once derivatized supports can already be used as such or be subjected to the described cycle once or several times.

For example, a method based on the blue staining of amino functions by bromophenol blue is suitable for controlling the quality of the support derivatization, i.e. detection takes place via the disappearance or appearance of the blue staining occuring with the activation or reaction with amines. For this purpose, each reaction vessel is provided in addition to the support materials to be derivatized with a piece of aminated polypropylene sheet (PP control piece) which serves for checking, on behalf of all of the support materials in the reaction vessel, the success of the respective reaction step. For this purpose, a piece of the control strip is removed after each reaction and swirled in a 1% bromophenol blue solution in amine-free DMF and then washed with ethanol. Amino functions and other basic groups yield an intense adsorptive blue staining. After carrying out the activation reactions (e.g. with acryloylchloride, 4-nitrophenylchloroformate, carbonyldiimidazole), detection is made for the disappearance of the blue staining. A quantification of the surface charge is possible by means of U.V. spectroscopy. Here, the adsorptive blue staining is removed from the support e.g. by means of a 10% piperidine solution in DMF and is measured by means U.V. spectroscopy.

The linkers on the support surface have linear structures or dendrimer structures. The structures are built up as follows:

preferred structure after activation using acryloylchloride

X=O, NHR$_1$

Y, Z=may be equal or different and may be selected from
—(CH$_2$) n—
—(CH$_2$CH$_2$O)$_n$—CH$_2$CH$_2$
—(CH$_2$CH$_2$CH$_2$O)$_n$—CH$_2$CH$_2$CH$_2$—, etc.

R$_1$–R$_5$=may be equal or different analogous to R$_1$ and R$_2$ above

N=1–50, preferably 1–20, most preferably 1–10 preferred structure after activation with chloroformic acid nitrophenylester or carbonyldiimidazole

X=O, NHR$_1$

Y, Z=may be equal or different and may be selected from $R_1$–$R_5$=may be equal or different analogous to $R_1$ and $R_2$ above n=1–50, preferably 1–20, most preferably 1–10

When biopolymers are fixed to support surface derivatized with the linker system, a distinction can, in principle, be made between the 2 cases (a) and (b):

(a) In Situ Synthesis of Biopolymers (Using the Oligonucleotide Synthesis as an Example):

The derivatized support surfaces having terminal amino or hydroxyl functions do not require any further modification for binding the 1$^{st}$ oligonucleotide building block according to the phosphoramidite method or also the phosphotriester method. Having reacted the 1$^{st}$ nucleotide reagent with the aminated surface, phosphoramidate type bonds are produced. Hydroxylated surfaces result in phosphodiester type bonds.

Phosphoramidite Method:

phosphoramidate phosphodiester

Phosphotriester Method:

phosphoramidate phosphodiester (Nuc = nucleoside)

$R_1$–$R_3$=analogous to $R_1$ and $R_2$ above

If phosphodiester type bonds are aimed at, it suffices not to react bis-amine in the last step but to react an amino alcohol within the linker-system synthesis.

(b) Binding of "Prefabricated" Biopolymers:

The binding of the biopolymer provides either the generation of a covalent (permanent) chemical linkage of the biomolecule to the support surface or also a permanent linkage via electrostatic interaction. In the former case, a chemical bond must be produced between the biomolecule and the surface. In order to produce this bond, e.g. the following procedure is in consideration:

(A) addition of a promoter (B) activation of one of the two reactants (biomolecule or surface). However, an activation of the support surface has to be preferred over an activation of the biomolecule, since undesired cross-reaction among the activated biomolecules cannot be excluded—due to the usually polyfunctional character of the biomolecule—when the biomolecule per se is activated. This activation of the surface is preferably carried out using cross-linkers.

When the biopolymer is bound by electrostatic interaction, the positive charge, which forms by the described linker system using amine-produced dendrimeric surfaces, in particular by the incorporation of the amines (preferably bis-amines and polyamine), permits a permanent immobilization of negatively charged biopolymers (e.g. nucleic acids). No further activation of the surface is necessary for this purpose. According to the invention the biopolymer is applied directly onto the dendrimeric surface and is fixed permanently. The properties for the permanent immobilization of biopolymers by electrostatic interaction are increased according to the invention by alkylating, e.g. methylating, the dendrimeric surface beforehand.

(A) Binding of the Biopolymer Using a Promoter

The possibility of using a promoter (catalyst) for producing the covalent bond between surface and biomolecule, is substantially a 3-component reaction. If as in the present invention possibilities are aimed at which shall permit to fix in highly parallel manner a large number of biopolymers to accurately predetermined positions on a support, this can be done due to cross-contamination only with more difficulty on plane surfaces using a 3-component system (sheets, glass or the like). Therefore, the promoter method is a special case for the covalent linkage of biopolymers on membrane type surfaces. Only here can the promoter be provided locally to the biomolecule to be bound in the pores of the membrane without cross-contamination having to be expected (cf. Example 4). For example, reagents of the carbodiimide type, such as diisopropylcarbodiimide, EDC or DCC (dicyclohexylcarbodiimide), are suitable as promoters. Furthermore, the terminal groups should on the support and the biomolecule be preferably orthogonal relative to one another, i.e. they should be able to enter into a useful chemical bond. Here, preferably the following combinations of the terminal groups to be reacted result:

| Support surface | biomolecule | resulting binding type |
|---|---|---|
| Amino (—NHR) | carboxy (—COOH) | amide bond |
| Amino (—NHR) | phosphate (—$PO_4^{2-}$) | phosphoramidite |
| Hydroxyl (—OH) | carboxy (—COOH) | ester |
| Hydroxyl (—OH) | phosphate (—$PO_4^{2-}$) | phosphodiester |
| Carboxy (—COOH) | amino (—NHR) | amide bond |
| Carboxy (—COOH) | hydroxyl (—OH) | ester |
| Phosphate (—$PO_4^{2-}$) | amino (—NHR) | phosphoramidate |
| Phosphate (—$PO_4^{2-}$) | hydroxyl (—OH) | phosphodiester |

Since the reactive groups (amine, hydroxyl, phosphate or carboxyl) are more or less given by the biomolecule, it is recommended that every biomolecule type has available a corresponding orthogonal surface type. In order to make available the support surface derivatization with the linker system for all of the above-mentioned combinations of terminal groups, methods were developed for re-derivatizing the surface of terminal amino functions (or also hydroxyl) on terminal hydroxyl, carboxyl and phosphate groups (cf. Examples 5, 6, 7).

Re-Derivatization on Terminal Hydroxyl:

Re-Derivatization on Terminal Carboxyl:

-continued

Re-Derivatization on Terminal Phosphate:

(B) Binding of the Biopolymer by Means of Cross-Linkers

A covalent surface activation is understood to mean an activation in which cross-linkers are so to speak grafted as a terminal group onto the linker system built up according to the invention beforehand (flexible linker system). They are above all activated ester, aldehyde, imidoester or isothiocyanate functions which are capable of covalently binding without further chemical step to biopolymers dissolved in aqueous systems. Here, above all dissuccinimidyl carbonate, dissuccinimidyl oxalate, glutaraldehyde, dimethylsuberimidate dihydrochloride or phenylene diisothiocyanate have to be mentioned as the reagents to be chosen. The reaction is carried out preferably under basic conditions, i.e. with the addition of diisopropylethylamine or $NaCO_3$.

Principle:

$$\begin{bmatrix} \text{Bio—OH/Bio—NH}_2 = \\ \text{hydroxy-/amino-Biomolecule} \end{bmatrix}$$

The invention is further described by means of the figures which show.

BRIEF DESCRIPTION OF THE FIGURES

EXAMPLE 1

Derivatization of a Glass Support

It is started from aminated glass supports (40×48 mm) which is either commercially available or can be prepared according to the common methods of silanization. For activating the amino functions, the aminated glass supports are placed in 20 ml anhydrous dichloroethane with 200 mg 4-nitrophenyl chloroformate (1 mmol) and 171 µl diisopropylethylamine (1 mmol) and swirled on a shaker for 2 hours. The BPB control test shows no blue staining. The glass supports are reacted overnight in 20 ml amine-free DMF with 223 µl tetraethylene pentamine (1 mmol). The BPB control test shows a blue staining. For starting a new cycle, the glass supports are placed in 20 ml anhydrous dichloroethane with 200 mg 4-nitrophenyl chloroformate (1 mmol) and 171 µl diisopropylethylamine (1 mmol) and swirled on a shaker for 2 hours. The BPB control test shows no blue staining. The glass supports are reacted overnight in 20 ml amine-free DMF with 140 µl 1,4-bis(3-aminopropyloxy)butane (1 mmol). The BPB test shows a blue staining.

The thus derivatized glass supports now have, on their surface, linkers to which the biopolymers (e.g. nucleic acids) can be linked.

EXAMPLE 2

Derivatization of a Glass Support

It is started from an aminated glass support (40×48 mm) which is either commercially available or can be prepared according to the common methods by means of silanization. For activating the amino functions, the aminated glass supports are placed in 20 ml anhydrous dichloroethane with 81 µl acryloylchloride (1 mmol) and 171 µl diisopropylethylamine (1 mmol) and swirled on a shaker for 2 hours. The BPB control test shows no blue staining. The glass supports are reacted for 2 nights in 20 ml amine-free DMF with 223 µl tetraethylene pentamine (1 mmol). The BPB control test shows a blue staining. For starting a new cycle, the glass supports are placed in 20 ml anhydrous dichloroethane with 81 µl acryloylchloride (1 mmol) and 171 µl diisopropylethylamine (1 mmol) and swirled for 2 nights on a shaker. The BPB control test shows no blue staining. The glass supports are reacted for 2 nights in 20 ml amine-free DMF with 140 µl 1,4-bis(3-aminopropxy)butane (1 mmol). The BPB test shows a blue staining.

The thus derivatized glass supports then have, on their surface, linkers to which the biopolymers (e.g. nucleic acids) can be linked.

EXAMPLE 3

Derivatization of Polypropylene Membranes

It is started from a purchasable hydrophilized polypropylene membrane (8×12 cm). For the purpose of activation, the membrane is reacted with 324 µl acryloylchloride (4 mmol) and 684 µl diisopropylethylamine (4 mmol) in 30 ml anhydrous dichloroethane on a shaker. After 2 hours, the reaction solution is decanted and washed several times carefully with dichloroethane and dried. The bromophenol blue test (BPB test) shows no blue staining. The activated membrane is subsequently swirled for 2 days with 892 µl tetraethylene pentamine (4 mmol) in 30 ml amine-free DMF on a shaker. Then, the reaction solution is decanted and the membrane is washed carefully several times with DMF and then with dichloroethane and dried. The bromophenol blue test shows blue staining. For further activation the then aminated membrane is again reacted with 324 µl acryloylchloride (4 mmol) and 684 µl diisopropylethylamine (4 mmol) in 30 ml anhydrous dichloroethane on a shaker. After 2 hours, the reaction solution is decanted and washed several times carefully with dichloroethane and dried. The bromophenol blue test (BPB test) shows no blue staining. Thereafter, the activated membrane is swirled for 2 days with 560 µl 1,6-bis(3-aminopropyloxy)butane (4 mmol) in 30 mol amine-free DMF on a shaker. Then, the reaction solution is decanted and the membrane is washed carefully several times with DMF and then with dichloroethane and dried. The bromophenol blue test (BPB test) shows blue staining.

EXAMPLE 4

Binding of Nucleic Acids to Polypropylene Membranes a) Binding by Means of an Activating Agent A polypropylene membrane derivatized according to Example 3 (8×12 cm) is incubated on a Whatman filter paper for 5 min. with a solution of 54 mg N-(3-dimethylaminopropyl)-N'-ethyl-carbodiimide hydrochloride and 24 ml N-methylimidazole in 10 ml water. The reaction solution is decanted. The thus activated still moist polypropylene membrane can then be used for covalent application of biopolymers (nucleic acids). After applying the biopolymers (e.g. by spotting robots or nano plotter), the samples are fixed on the membrane by 2 h of incubation at 65° C.; thereafter the membrane is washed carefully with water.

b) Binding by Means of Electrostatic Interaction Under Non-Denaturing Conditions A polypropylene membrane derivatized in analogy to Example 3 (8×12 cm) is moistened with water on a filter paper. The moist membrane can then be used directly for the application of biopolymers. Having applied the biopolymers (e.g. by means of a spotting robot) the samples are fixed on the membrane by 2 hours of incubation at 65° C. Thereafter, the membrane is washed thoroughly with water.

As an alternative, the biopolymers can also be applied directly onto a dry membrane.

c) Binding by Means of Electrostatic Interaction Under Denaturing Conditions

A polypropylene membrane derivatized in analogy to Example 3 (8×12 cm) is soaked on a filter paper with 10 ml denaturing buffer (0.5 M NaOH, 1.5 M NaCl). After 10 minutes of incubation, the supernatant of denaturing buffer is decanted. The still moist membrane can then be used for immobilizing biopolymers. Having applied the biopolymers (e.g. by means of a spotting robot), the membranes are dried overnight at room temperature. Thereafter, the membrane is washed thoroughly with water.

EXAMPLE 5

Synthesis of Terminal Hydroxyl Groups a) Activation with Chloroformic Acid-4-nitrophenyl Ester:

An amino-functionalized polypropylene membrane (omnitray size) according to Example 3 is swirled in 30 ml anhydrous dichloroethane with 400 mg chloroformic acid-4-nitrophenylester (2 mmol) and 342 µl diisopropylethylamine (2 mmol) for 2 hours on a shaker. Washing is carried but 2×for 5 minutes each with 50 ml dichloromethane and drying takes place in a nitrogen current. The thus activated PP membrane is then swirled with 200 ml 2-(2-aminoethoxy)ethanol (2 mmol) in 30 ml amine-free DMF for 30 min. on a shaker. The reaction solution is then decanted. After short washing with DMF, the PP membrane is again admixed with 200 µl 2-(2-aminoethoxy)ethanol (2 mmol) in 30 ml amine-free DMF and swirled overnight on a shaker. The reaction solution is decanted and the PP membrane is washed 2 times for 5 minutes each with 50 ml DMF and then 2 times with 50 ml acetone and is dried.

b) Activation with Acryloylchloride:

An amino-functionalized polypropylene membrane (omnitray size) according to Example 3 is swirled in 30 ml anhydrous dichloroethane with 162 µl acryloylchloride (2 mmol) and 342 µl diisopropylethylamine (2 mmol) for 2 hours on a shaker. Washing is carried out 2 times for 5 minutes each with 50 ml dichloromethane and drying takes place in a nitrogen current. The thus activated PP membrane is then swirled with 200 µl 2-(2-aminoethoxy)ethanol (2 mmol) in 30 ml amine-free DMF for 30 minutes on a shaker, whereupon the reaction solution is decanted. After short washing with DMF, the PP membrane is again admixed with 200 µl 2-(2-aminoethoxy)ethanol (2 mmol) in 30 ml amine-free DMF and swirled overnight on a shaker. The reaction solution is decanted and the PP membrane is washed 2 times for 5 minutes each with 50 ml DMF and then 2 times with 50 ml acetone and is dried.

EXAMPLE 6

Synthesis of Terminal Carboxyl Groups

An amino-functionalized polypropylene membrane (omnitray size) according to Example 3 is reacted in 30 ml dry dichloroethane with 400 mg succinic anhydride (4 mmol), 1 ml pyridine (24 mmol) and 488 mg DMAP (4 mmol) overnight on a shaker. Subsequently, the reaction solution is decanted and the PP membrane is washed in succession with 30 ml dichloromethane, 30 ml acetone, 30 ml 1% HCl, 2×30 ml water and 2× with 30 ml acetone for 5 minutes each and is dried.

EXAMPLE 7

Synthesis of Terminal Phosphate Groups

While cooling in an ice bath, 0.42 ml $POCl_3$ (4 mmol) is dissolved in 40 ml dry pyridine. Thereafter, 828 mg 1,2,4-triazole (12 mmol) are added. After 10 minutes, the hydroxyl-functionalized polypropylene membrane according to Example 4 is added and swirled for another 10 minutes with ice bath cooling on a shaker. Thereafter, the ice bath is removed and swirling is continued for 45 minutes. The reaction solution is decanted and carefully hydrolyzed with 50 ml of a mixture of triethylamine/dioxane/water. Washing is carried out carefully two times with 50 ml water, shortly with 50 ml 1% HCl, 2 times with 50 ml water and 2 times for 5 minutes with 50 ml acetone and drying takes place in a nitrogen current.

EXAMPLE 8

Surface Activation with Disuccinimidyl Carbonate 7 amino-functionalized glass slides are swirled in 30 ml anhydrous acetonitrile with 256 mg disuccinimidyl carbonate (2 mmol) and 513 µl diisoproyplethylamine (3 mmol) for 4 hours on a shaker. Washing is carried out with 50 ml acetonitrile, then with 50 ml dichloroethane and drying takes place in a nitrogen current.

EXAMPLE 9

Methylation of a Glass Support for Improving the Properties for the Immobilization of Biomolecules by Electrostatic Interaction 7 items of derivatized glass supports (derivatized in analogy to Example 2) are incubated for 1.5 hours with a solution of 0.125 ml trifluoromethanesulfonic acid methyl ester (1.1 mmol) in 40 ml dichloroethane. Thereafter, thorough washing is carried out with dichloroethane and acetone and the supports are dried.

What is claimed is:

1. A method of producing a dendrimeric structure on a support surface, comprising the steps of:
   (a) activating a functional group on a support surface with a first activating reagent,
   (b) subsequently reacting the activated functional group with a polyamine,
   (c) reacting a second activating reagent with a component of the polyamine;
   (d) repeating step (c) several times; and
   (e) producing a dendrimeric structure on the support surface,
   wherein the first and the second activating reagents are independently selected from the group consisting of acryloylchloride, 4-nitrophenylchloroformate, carbonyl diimidazole, phenyl chloroformate, phosgene, disphosgene, triphosgene, EDC, N,N'-diisopropyl carbodiimide, dicyclohexyl carbodiimide, disuccinimidyl carbonate, disuccinimidyl oxalate, dimethylsuberimidate dihydrochloride, and phenylene diisothiocyanate.

2. The method according to claim 1, wherein the support is selected from the group consisting of glass, sheets, and films or membranes made from polypropylene, nylon, cellulose, cellulose derivatives, polyether sulfones, polyamides, polyvinyl chloride, polyvinylidene fluoride, polyester, polyethylene and synthetic resinous flouorine-containing polymers.

3. The method according to claim 2, further comprising a subsequent step of activating the support surface prior to the attachment of biopolymers.

4. The method according to claim 3, wherein the support surface of the dendrimeric structure is additionally activated by an activating agent selected from the group consisting of disuccinimidyl carbonate, disuccinimidyl oxalate, glutaraldehyde, dimethylsuberimidate dihydrochloride, and phenylene diisothiocyanate.

5. The method according to claim 2, wherein said support is cellulose derivatives of cellulose acetate or cellulose-mixed ester.

6. The method according to claim 1, wherein the functional group is an amine, hydroxyl, phosphate, carboxyl, carbonyl, thiol or amide group.

7. The method according to claim 1, wherein the polyamine is tetraethylene pentamine, spermine, spermidine, 4,7,10-trioxa-1,13-tridecanediamine, or 4-aminomethyl-1,8-octanediamine.

8. The method according to claim 1, wherein a positive charge is built up in a controlled fashion on the support surface.

9. The method according to claim 1, wherein said support is a biochip.

* * * * *